United States Patent
Maimets (12) 
(10) Patent No.: US 6,240,965 B1
(45) Date of Patent: Jun. 5, 2001

(54) APPARATUS FOR REPAIR OF HIGH TEMPERATURE AND PRESSURE CONDUITS, METHOD FOR REPAIRING HIGH TEMPERATURE AND PRESSURE CONDUITS, AND A SEALING DEVICE FOR REPAIRING HIGH TEMPERATURE AND PRESSURE CONDUITS

(75) Inventor: Lembits Maimets, Richmond Hill (CA)

(73) Assignee: Link-Pipe (H.K.), Ltd., Kowloon (HK)

( * ) Notice: Subject to any disclaimer, the term of this patent is extended or adjusted under 35 U.S.C. 154(b) by 0 days.

(21) Appl. No.: 09/296,674

(22) Filed: Apr. 22, 1999

Related U.S. Application Data
(60) Provisional application No. 60/082,902, filed on Apr. 24, 1998.

(51) Int. Cl.[7] .................................................. F16L 55/163
(52) U.S. Cl. ............................ 138/98; 138/97; 29/402.09; 405/150.1
(58) Field of Search .................... 138/97, 98; 405/150.1; 29/402.09, 402.13, 402.16, 523

(56) References Cited

U.S. PATENT DOCUMENTS

| | | | |
|---|---|---|---|
| Re. 30,802 | * 11/1981 | Rogers, Jr. ............................... | 138/98 |
| 3,642,032 | 2/1972 | Cook et al. . | |
| 3,678,560 | * 7/1972 | Dufour et al. ........................... | 138/97 |
| 4,069,573 | * 1/1978 | Rogers, Jr. et al. .................... | 138/98 |
| 4,346,922 | 8/1982 | Ohtsuga et al. . | |
| 4,347,018 | * 8/1982 | Wrightson et al. ..................... | 138/97 |
| 4,762,674 | * 8/1988 | Cheng et al. ........................... | 138/98 |
| 5,040,283 | * 8/1991 | Pelgrom ................................ | 138/97 |
| 5,076,730 | * 12/1991 | Bergey ................................... | 138/97 |
| 5,119,862 | 6/1992 | Maimets et al. . | |
| 5,190,705 | * 3/1993 | Corazza ................................. | 138/97 |
| 5,351,720 | 10/1994 | Maimets . | |
| 5,787,933 | * 8/1998 | Russ et al. ............................. | 138/97 |
| 5,878,783 | * 3/1999 | Smart ..................................... | 138/97 |

FOREIGN PATENT DOCUMENTS

97/11306   3/1997   (WO) .

OTHER PUBLICATIONS

PCT/IPEA/408 Written Opinion issued on Feb. 9, 2000.

* cited by examiner

Primary Examiner—James Hook
(74) Attorney, Agent, or Firm—Greenblum & Bernstein, P.L.C.

(57) ABSTRACT

A conduit repair apparatus includes a carriage configured for movement within a conduit, the carriage including a carrying frame and a drive member. An expansion and brake mechanism is provided on the carriage, and includes at least one radially movable engagement member to apply a radially outwardly directed force. A mechanical force applicator mechanism is provided on the carriage and includes at least one force applicator configured to apply radially outwardly directed pressure and for rotation about an axis of rotation. A power source is connected to the force applicator mechanism to rotatably drive the force applicator about the axis of rotation, whereby the force applicator mechanism can be actuated and simultaneously rotated to thereby apply radially outwardly directed pressure uniformly to an inner wall of a repair sleeve positioned within the conduit. A method of repairing a conduit includes positioning a repair sleeve at a location within a conduit to be repaired, expanding the repair sleeve into engagement with an inner wall of the conduit by actuation of an expansion and brake mechanism exerting an internal outwardly directed radial force on the repair sleeve, further deforming the repair sleeve into sealing engagement with the inner wall of the conduit by actuation of a force application mechanism exerting a rotating internal outwardly directed radial force on the repair sleeve.

36 Claims, 5 Drawing Sheets

APPARATUS FOR REPAIR OF HIGH TEMPERATURE AND PRESSURE CONDUITS, METHOD FOR REPAIRING HIGH TEMPERATURE AND PRESSURE CONDUITS, AND A SEALING DEVICE FOR REPAIRING HIGH TEMPERATURE AND PRESSURE CONDUITS

CROSS-REFERENCE TO RELATED APPLICATIONS

The present application claims the benefit of U.S. Provisional Application No. 60/082,902, filed Apr. 24, 1998, the subject matter of which is herein expressly incorporated by reference.

BACKGROUND OF THE INVENTION

1. Field of the Invention

The present invention is related primarily to an apparatus, method, and sealing device for repairing pipes and conduits, particularly high temperature, high pressure pipes and conduits, such as steam lines. More particularly, the invention is directed to an internal repair of a section of damaged, weakened, or leaking pipe or conduit, in which the section to be repaired is typically located in an inaccessible area, such as underground.

2. Background and Material Information

Conduit systems for conveying natural gas, water, and steam are typically located underground and, in general, are not easily accessible if repair or other maintenance is required after installation. Over a period of time, such conduit systems can become damaged, weakened, or can otherwise begin to leak, particularly at the joints between adjacent conduit sections, but also longitudinally along sections of the conduit. Thus, there can be a problem of ex-filtration of gas, water or steam from the damaged conduit sections.

Furthermore, in the repair of high temperature, high pressure pipes and conduits, such as steam lines, which are utilized by utility companies, there is usually a need to effect the repairs in as short a time period as possible. Thus, there is a need to effect high strength repairs to such high temperature, high pressure pipes and conduits quickly so that the utility lines can be returned to service in a relatively short period of time, such as less than one day.

Additional problems associated with similar systems, and a number of previous repair methods and apparatuses are disclosed, for example, in U.S. Pat. Nos. 5,119,862 and 5,351,720. These patents, which disclose "No-Dig" or non-excavation repairs, utilize a sleeve or liner which is transported to the site of the weakened or damaged pipe in a coiled or partially coiled configuration. Once the repair liner is located in the necessary position at the site of the repair, internal pressure is applied to the sleeve by means of an inflatable bladder or other means, which causes the sleeve to begin to uncoil and expand in the direction of the "host" pipe to be repaired. The sleeve, which includes a gasket or sealing compound on its outer surface, reaches a slight over-expanded condition, whereby the liner compresses the gasket or sealing compound against the inner surface of the host pipe. The internal pressure is then reduced or removed and the sleeve is slightly recoiled, whereby overlapping edges of the sleeve become locked in place by virtue of complementary locking devices.

The methods and apparatus disclosed in the aforementioned patents are intended primarily for the repair of conduits that carry wastewater and other fluids that are not in an over-pressure environment. However, a high temperature, high pressure pipe, such as a steam line, also requires periodic repair, particularly for sealing against ex-filtration, i.e., against a leak of the high temperature, high pressure fluid, such as steam, from the inside to the outside of the pipe.

The methods and apparatus disclosed in the aforementioned patents are useful for the repair of moderately high pressure pipes or conduits, although a particular problem, explained below, is posed. The size of these pipes is typically between 4 inches and 36 inches in diameter or even greater. Unlike an elastic compressible gasket or a polyurethane foam, e.g., which are usable for the repairs described in U.S. Pat. No. 5,351,720, high temperature, high pressure pipes and conduits may not be suitable for use with compressible gaskets, foam sealants, or epoxy resins or other curable, non-expansible sealants that are typically used in the prior art methods because the high temperatures and the moisture in the steam may degrade such sealants, breaking them down, and causing them to fail. Thus, the high temperature, high pressure fluid conveyed within the conduit may ex-filtrate through the degraded sealant, or the pressure of the fluid may cause the repair sleeve to fracture in the area of the repair which would also allow the fluid to ex-filtrate through the repaired section.

SUMMARY OF THE INVENTION

One aspect of the present invention is to provide for an apparatus, method, and sealing device for repairing high temperature and high pressure pipes and conduits, when a compressible gasket, foam sealant, epoxy or other curable, non-expansible sealant is not suitable to be utilized in the repair.

More particularly, another aspect of the present invention is to provide for the repair of high temperature, high pressure pipes and conduits with a malleable repair sleeve that is pressed or hammered into tight engagement with the inner wall of the pipe or conduit to be repaired to create a seal which prevents ex-filtration.

According to another aspect of the present invention, a conduit repair apparatus is provided that includes a carriage constructed and arranged for movement within a conduit in which repairs are to be effected, the carriage including a carrying frame and a drive member. The apparatus also includes an expansion and brake mechanism provided on the carriage, the expansion and brake mechanism including at least one radially movable engagement member operatively mounted to apply a radially outwardly directed force. A force applicator mechanism is provided on the carriage, and the force applicator mechanism includes at least one radially movable pressure member operatively mounted to apply radially outwardly directed pressure and for rotation about an axis of rotation generally coincident with a central longitudinal axis of the conduit in which repairs are to be effected.

A power source is operatively connected to force applicator mechanism to rotatably drive the at least one pressure member about the axis of rotation, whereby a repair sleeve positionable within the conduit can be radially expanded by the expansion and brake mechanism into engagement with an inner wall of the conduit, the expansion and brake mechanism can be positioned at a location outside the repair sleeve and radially expanded to engage the inner wall of the conduit to hold the carriage fixed relative to the conduit, and the force applicator mechanism can be operated to radially actuate the at least one radially movable pressure member and simultaneously to rotate the at least one pressure member about the axis of rotation to thereby apply radially outwardly directed pressure uniformly to an inner wall of the repair sleeve. Thus, the conduit repair apparatus of the present invention permits rapid repair of high temperature, high pressure conduits, such as steam pipes, without requiring excavation at the site of the repair.

In another aspect of the present invention, the expansion and brake mechanism of the conduit repair apparatus includes a plurality of radially movable engagement members, and the engagement members are generally uniformly radially spaced about a central axis. Furthermore, the at least one engagement member may be operatively connected to the carriage by at least one of an hydraulic actuator, a pneumatic actuator, and a mechanical actuator which effects radial outward movement of the at least one engagement member. Additionally, the at least one radially movable pressure member may be operatively connected to the carriage by at least one of an hydraulic actuator, a pneumatic actuator, and a mechanical actuator which effects radial outward movement of the pressure member to apply the radially outwardly directed pressure, which thereby expands and deforms the repair sleeve into tight engagement with the conduit inner wall to form an effective seal.

In other aspects of the present invention, the at least one radially movable pressure member of the conduit repair apparatus may include a hammering applicator for applying repeated hammering strokes to the inner wall of the repair sleeve, or the at least one radially movable pressure member may include a rolling applicator for applying a spinning force application to the inner wall of the repair sleeve. Additionally, the at least one radially movable pressure member may also include a pressing applicator for applying a pressing force application to the inner wall of the conduit to thereby expand and deform the repair sleeve into tight engagement with the conduit inner wall to form an effective seal.

According to another aspect of the present invention, the force applicator mechanism of the conduit repair apparatus is operatively mounted on the carriage to provide a generally helical path of movement of the at least one pressure member relative to the inner wall of the repair sleeve. In this regard, the at least one pressure member may be rotatably mounted on the carriage to move in a plane of rotation oriented at an angle of less than 90° with respect to a central longitudinal axis of the repair sleeve to provide the generally helical path of movement of the at least one pressure member relative to the inner wall of the repair sleeve. Thus, the at least one pressure member is engagable with the inner wall of the repair sleeve to deform the sleeve along the generally helical path to cause the at least one pressure member to thread itself within the repair sleeve. Alternatively, the force applicator mechanism may be operatively mounted on the carriage and driven by the power source to move along a longitudinal axis of the carriage to provide the generally helical path of movement of the at least one pressure member relative to the inner wall of the conduit. In this manner, the repair sleeve is uniformly deformed along the generally helical path and throughout the length of the repair sleeve to form an effective seal with the conduit.

In another aspect of the present invention, the conduit repair apparatus is provided in combination with a malleable repair sleeve, the repair sleeve being expandable by the expansion and brake mechanism into engagement with an inner wall of the conduit to be repaired, and subsequently the repair sleeve is further deformable by the force applicator mechanism such that an outer surface of the repair sleeve can be firmly pressed into engagement with the inner wall of the conduit to create a seal to effect the repair. The malleable repair sleeve may include a bi-metal repair sleeve having an inner layer of a first malleable material and an outer layer of a second malleable material. Furthermore, the second malleable material is softer than the first malleable material, and the first malleable material may further include steel and the second malleable material may be selected from the group including lead, tin, bronze and buter. Thus, the softer outer layer forms an effective seal with the inner wall of the conduit, while the inner layer provides support therefor.

In a further aspect of the present invention a method of repairing a conduit is provided. The method includes positioning a repair sleeve at a location within a conduit to be repaired, expanding the repair sleeve into engagement with an inner wall of the conduit by actuation of an expansion and brake mechanism exerting an internal outwardly directed radial force on the repair sleeve, and further deforming the repair sleeve into sealing engagement with the inner wall of the conduit by actuation of a force application mechanism exerting an internal rotating, outwardly directed radial force on said repair sleeve. The method of repairing a conduit may include providing the rotating internal radial force by hammering, by spinning, or by pressing to deform the repair sleeve to thereby form the seal.

According to another aspect, the method of repairing a conduit may further include mounting the expansion and brake mechanism and the force application mechanism on a movable carriage, and wherein the positioning may be provided by initially mounting the repair sleeve on expansion and brake mechanism and moving the carriage with the repair sleeve mounted on the expansion and brake mechanism to the location. The method may also include moving the carriage to move the expansion and brake mechanism to a position spaced from the repair sleeve subsequent to the expanding of the repair sleeve into engagement with an inner wall of the conduit by actuation of the expansion and brake mechanism, and further actuation of the expansion and brake mechanism to thereby engage the inner wall of the conduit to fixedly position the carriage within the conduit.

In another aspect, the method of repairing a conduit may include rotatably mounting the force applicator mechanism on the carriage for rotation by a power source mounted on the carriage, the force applicator mechanism including at least one radially actuatable member for exerting the outwardly directed radial force, and whereby the deforming of the repair sleeve results from rotating the force application mechanism during actuation of the at least one radial actuatable member. The method may further include advancing the force applicator mechanism along a central longitudinal axis of the repair sleeve during rotation of the force applicator mechanism to effect uniform deformation of the repair sleeve along a length thereof. In this respect, the force applicator mechanism may be mounted on the carriage such that a plane of rotation of the at least one radial actuatable member is positioned at an angle of less than 90° with respect to the longitudinal axis of the repair sleeve such that the at least one radial actuatable member moves along a generally helical path and thereby threadably engages and deforms the repair sleeve to effect the advancing of the force applicator mechanism. Again, the deforming of the repair sleeve may include hammering, spinning, or pressing to thereby effect the seal.

In a further aspect of the present invention the method of repairing a conduit may further include providing the repair sleeve as a malleable repair sleeve such that an outer surface of the repair sleeve can be firmly pressed into engagement with the inner wall of the conduit to form a seal therewith in order to effect the repair. The the malleable repair sleeve may be formed as a bi-metal repair sleeve having an inner layer of a first malleable material and an outer layer of a second malleable material, the second malleable material is softer than the first malleable material, and the first malleable material may be steel and the second malleable material may be selected from the group including lead, tin, bronze and buter.

The method of repairing a conduit, according to another aspect of the invention, includes providing the repair sleeve as a malleable repair sleeve having a generally tubular member having an outer diameter selected to be smaller than an inner diameter of a conduit to be repaired, and providing the generally tubular member with at least one longitudinal indentation extending inwardly thereof along an entire length of the malleable repair sleeve. Thus, the repair sleeve may be readily positioned within the conduit and the at least one longitudinal indentation may be subsequently outwardly deformed by the expanding to cause an outer surface of the malleable repair sleeve to frictionally engage the inner wall of the conduit. This maintains the repair sleeve in fixed position relative to the inner wall of the conduit during subsequent expansion and deformation operations.

According to another aspect of the present invention, a repair sleeve for use in repair of a high temperature and pressure conduit is provided. The repair sleeve may be formed as a malleable repair sleeve constructed and arranged such that an outer surface of the repair sleeve can be firmly pressed into engagement with an inner wall of the conduit to form a seal therewith in order to effect the repair. The malleable repair sleeve may be formed as a bi-metal repair sleeve having an inner layer of a first malleable material and an outer layer of a second malleable material, and the second malleable material is softer than the first malleable material. Additionally, the first malleable material may include steel and the second malleable material may be selected from the group including lead, tin, bronze and buter.

In another aspect of the present invention, the malleable repair sleeve is formed as a generally tubular member having an outer diameter selected to be smaller than an inner diameter of a conduit to be repaired, and the generally tubular member includes at least one longitudinal indentation extending inwardly thereof along an entire length of the malleable repair sleeve. Thus, the malleable repair sleeve may be readily positioned within the conduit and the at least one longitudinal indentation may be subsequently outwardly deformed to cause an outer surface of the malleable repair sleeve to frictionally engage the inner wall of the conduit. This maintains the repair sleeve in fixed position relative to the inner wall of the conduit during subsequent expansion and deformation operations. The malleable repair sleeve may include a plurality of the indentations, and may be formed as a bi-metal repair sleeve having an inner layer of a first malleable material and an outer layer of a second malleable material, with the second malleable material being softer than the first malleable material, and the first malleable material may be formed of steel and the second malleable material may be selected from the group including lead, tin, bronze and buter. Accordingly, the malleable, generally tubular repair sleeve of the present invention may be readily utilized by suitable internal deformation so that the softer outer layer is pressed into tight engagement with the inner wall of the conduit to form an effective seal with the inner wall of the conduit, while the inner layer provides adequate support to maintain the repair.

BRIEF DESCRIPTION OF THE DRAWINGS

The above and other features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

With respect to the drawings, only enough of the construction of the invention has been depicted, to simplify the illustrations, as needed for those of ordinary skill in the art to readily understand the underlying principles and concepts of the present invention.

Figure 1:
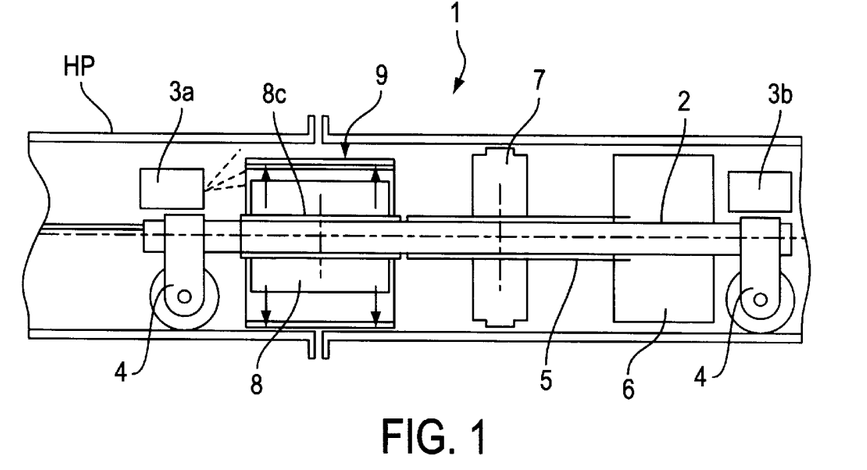
FIG. 1 is a diagrammatic view of one embodiment of the conduit repair apparatus, and illustrating a method for repairing high temperature and pressure conduits, of the present invention in a first operative position.
Figure 2:
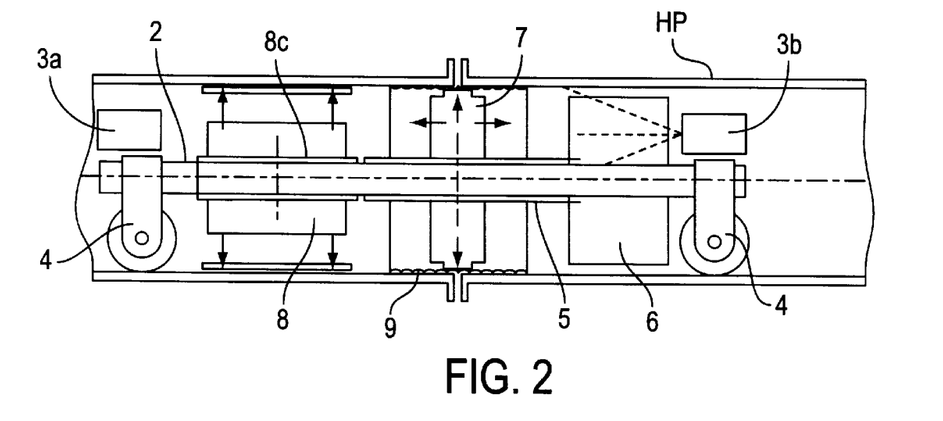
FIG. 2 is a diagrammatic view of the conduit repair apparatus of the present invention in a second operative position thereof.

Referring to FIGS. 1 and 2, a high pressure conduit repair apparatus 1 is disclosed, and includes a carriage or carrying frame 2 having conventional wheeled devices 4 positioned at opposite ends thereof for movement within a host pipe HP to the location where the host pipe HP is to be repaired. The carriage 2 may be moved to the appropriate location within the host pipe HP by any suitable mechanism, such as by a cable attached to either or both ends of the carriage 2, the cable also being connected to a drive mechanism for pulling the respective cables to position the carriage 2 at a desired location. Alternatively, suitable self-propelled drive units connected to the wheeled assemblies 4 in a manner known to those skilled in the art may be utilized to propel the carriage in a self-propelled manner.

As can be seen in FIGS. 1 and 2, a CCTV camera or video camera 3a, 3b is positioned at each end of the carriage 2 to enable an operator to visually observe the location of the repair apparatus relative to the area of the host pipe HP to be repaired and to aid in positioning the conduit repair apparatus within the host pipe HP. Of course, as known to those skilled in the art, the cameras 3a, 3b may be directly wired, or signals may be broadcast in a conventional manner, to the receiving set. Also, the carriage 2 may include a self-contained power source for any self-propelled driving units, or appropriate power and signal cables may be connected to the conduit repair apparatus 1 and transported through the host pipe HP by the carriage 2 in a manner known to those skilled in the art.

The conduit repair apparatus 1 further includes an expansion and brake mechanism 8 upon which a repair sleeve 9 may be initially mounted for positioning at a location at which a repair is to be effected. The expansion and brake mechanism 8 is further depicted diagrammatically in FIG. 3 and includes a plurality of engagement members 8a and 8b which are each operatively connected in any suitable manner to a suitable drive device D for applying outwardly directed radial expansion force to each of the members 8a, 8b. Examples of such devices include hydraulic cylinders, pneumatic cylinders, or cam or gear driven mechanical devices which are well known to those of ordinary skill in the art and will not be set forth in further detail.

Figure 3:
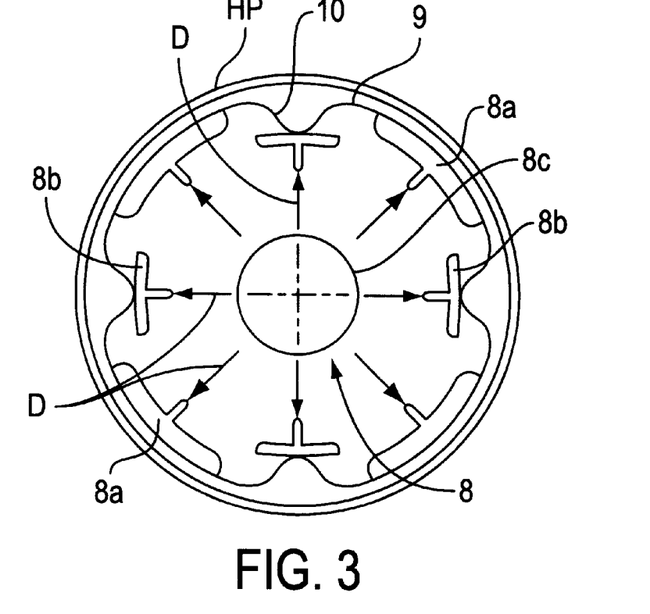
FIG. 3 is a diagrammatic view of an expansion and brake mechanism according to the present invention in operation during the first operational phase of the present invention.

The engagement members 8a and 8b are configured to have a curved outer surface to engage an inner wall of either a repair sleeve 9 or a host pipe HP, and the engagement members 8a, 8b may have a length corresponding to the length of a repair sleeve. Alternatively, a plurality of shorter engagement members 8a, 8b may be provided along the length of the repair sleeve 9 at each radial location (as seen in FIG. 3), which engagement members 8a, 8b can be individually supported on a central member 8c that is mounted on the carriage 2. In a further alternative, the expansion and brake mechanism can be configured in the form of a solid block of material (not illustrated) having a central opening forming the central member 8c, and the block of material having a plurality of radially extending bores forming conduits for hydraulic fluid to operate pistons also mounted within the bores. Engagement members 8a, 8b can be mounted on the pistons for radial outward movement relative to the block of material. In each of the above alternatives, the central member 8c may be fixed relative to the carriage 2, or the central member 8c may be mounted for rotational and/or longitudinal movement by an external or internal power drive unit in any conventional manner which will be apparent to those skilled in the art. When the central member 8c is fixed to the carriage 2, a separate rotatable hollow shaft is concentrically provided on or within the carriage 2 for transmission of rotational forces by a suitable power source.

Again referring to FIGS. 1 and 2, a force applicator mechanism 7 is mounted on a drive conduit 5 operatively positioned on the carriage 2. The force applicator mechanism 7 is schematically depicted as being connected to a power source 6 for rotation of the force applicator mechanism relative to the carriage 2. As shown in FIG. 2, the force applicator mechanism 7 is positionable within the repair sleeve 9 for the application of a further radial expansion force to the repair sleeve 9.

Figure 4:
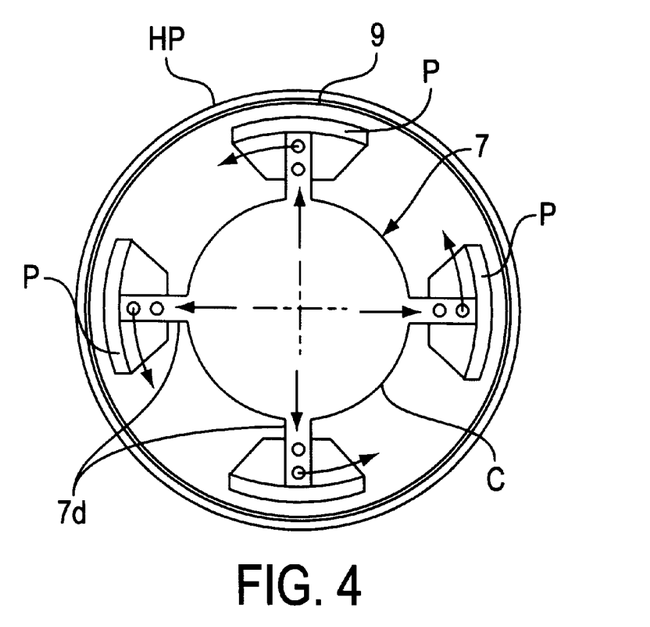
FIG. 4 is a diagramatic view of a first embodiment of a force applicator according to the present invention.
Figure 7:
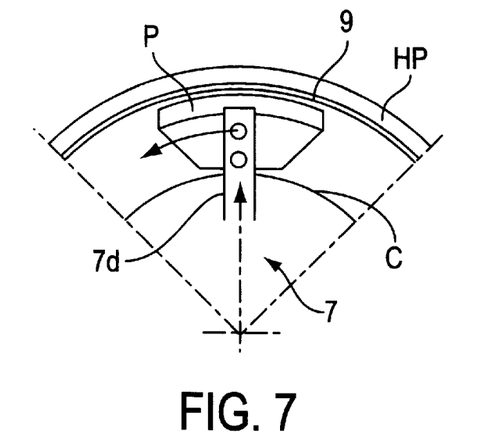
FIG. 7 is a partial diagrammatic view of the pressing applicators according to the first embodiment of the present invention.

As shown in FIGS. 4 and 7, the force applicator mechanism 7 may include a plurality of pressure members P that are operatively connected to a central member C and connected with the drive conduit 5 for rotation therewith. The pressure members P are also connected to the central member C by radial drive devices 7d for providing radial movement with respect to the center member C in any conventional manner. The radial drive devices 7d may include, for example, hydraulic cylinders, pneumatic cylinders, or mechanical operating devices such as a rack and pinion or cam and lifter drive mechanisms. The central member C may be connected to the drive conduit 5 in any conventional manner, such as by a splined connection between the central member C and the drive conduit 5.

When the force applicator mechanism 7 is positioned within the repair sleeve 9, the pressing applicators P are expanded radially outwardly while the force applicator mechanism 7 is rotated by the power source 6 to thereby impart a rotationally and radially outward force to the pressing applicators P which engage and deform the repair sleeve 9 into engagement with the host pipe HP. The power source 6 may be mounted on the carriage externally of the force applicator mechanism 7, as depicted in FIGS. 1 and 2. Alternatively, a power source may be provided internally of the force applicator mechanism 7, which power source may be electric, hydraulic or pneumatic.

Figure 5:
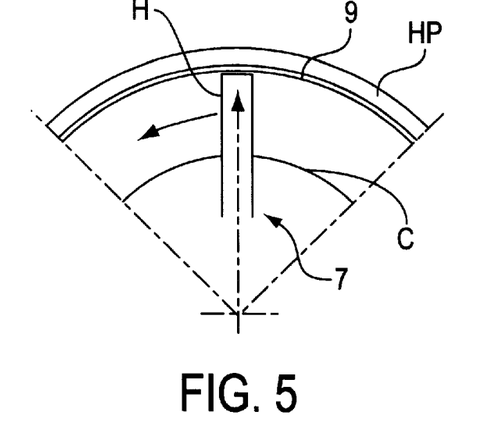
FIG. 5 is a partial diagrammatic view depicting the hammering applicators according to the present invention.
Figure 6:
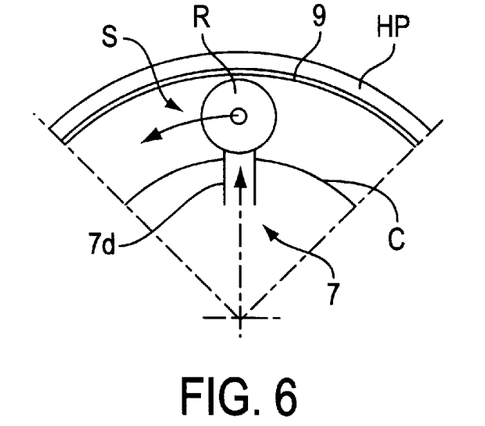
FIG. 6 is a partial diagrammatic view of the spinning applicators according to another embodiment of the present invention.

FIGS. 5 and 6 depict diagrammatic views of two alternatives of the force applicator mechanism 7 depicted in FIG. 7. In the embodiment of FIG. 5, the force applicator mechanism 7 is formed to include a plurality of hammering applicators H operatively connected to central member C. The hammering applicators H are constructed and arranged to apply a radially outward hammering force to the interior of the repair sleeve 9. The hammering applicators H will not be further described in detail, but such hammering applicators H may be formed in a conventional manner, as for example, in the manner of a conventional pneumatic or electric jack hammer, to apply a repeated cycle of hammering forces to the inner wall of the repair sleeve 9. As with the pressing applicators P of the embodiment of FIG. 7, the force applicator mechanism 7 of the embodiment of FIG. 5 is also rotatably mounted on the drive conduit 5 for rotation therewith such that the hammering forces of the hammering applicator H are applied radially about the interior of the repair sleeve 9 as the force applicator mechanism 7 is rotated.

In the embodiment depicted in FIG. 6, a plurality of spinning applicators S are provided on the force applicator mechanism 7. The spinning applicators S may include radially drive devices 7d mounted in a conventional manner with respect to the central member C. The radial drive devices 7f may be formed as conventional hydraulic cylinders, pneumatic cylinders, or mechanical devices as set forth above with respect to the embodiments of FIGS. 5 and 7. Furthermore, a wheel or roller R is rotatably mounted on the member 7d for rotational movement with respect thereto. Accordingly, as with the other embodiments, the spinning applicators S will apply a radially, outwardly directed force to the interior of the repair sleeve 9 while the spinning applicators S are rotated by the power source 6 to provide outward expansion and deformation of the repair sleeve 9.

Figure 9:
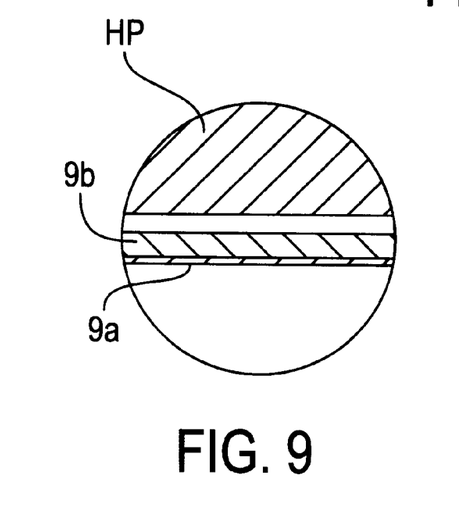
FIG. 9 depicts a partial cross-sectional view of a portion of the repair sleeve positioned within a host pipe prior to force application.
Figure 10:
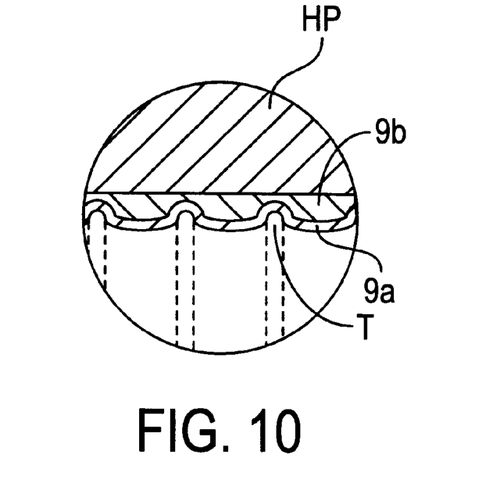
FIG. 10 is a partial cross-sectional view depicting the relationship of the host pipe and the repair sleeve subsequent to radial expansion of the repair sleeve.

The repair sleeve 9 suitable for use with the conduit repair apparatus 1 will now be described with reference to FIGS. 9–11. The repair sleeve 9 is a generally tubular bi-metal sleeve which is formed of a malleable inner metal portion 9a. The malleable inner portion 9a may be formed from any malleable material, for example, steel, stainless steel, malleable iron, etc., and the malleable inner portion 9a is covered on the outside thereof with a layer of softer malleable metal, for example, lead, tin, bronze, buter, or any suitable soft malleable material.

The repair sleeve 9 may have a total wall thickness in the range of about $\frac{1}{8}$ inch to about $\frac{5}{16}$ inch, and is preferably about $\frac{5}{16}$ inch. Accordingly, the thickness of the inner layer 9a may be from about 1/16 inch to about 1/8 inch, and is preferably about 1/16 inch, while the thickness of the outer layer 9b may be from about 1/16 inch to about 3/16 inch, and is preferably about 1/8 inch. Of course, the thickness of the layers 9a, 9b will be selected to have any suitable thickness which will provide appropriate sealing with the host pipe HP while retaining sufficient strength of the repair sleeve 9 to retain the sealed condition.

Furthermore, for installation, the outer diameter of the bi-metal repair sleeve 9 is configured to have an effective diameter that is smaller than the inside diameter of the host pipe HP in which it is to be used. One of ordinary skill in the art will readily recognize that a plurality of repair sleeves 9 having a plurality of effective outer diameters to correspond to the various inside diameters of conventional host pipes HP, and will depend upon the inside diameter of the host pipe for which repairs are to be effected. Moreover, the length of the repair sleeve 9 can be provided to have any suitable length to effect the necessary repairs. Also, the repair sleeve 9 may be formed to have a length greater than necessary for an individual repair, and a length suitable for effecting a necessary repair may be cut therefrom in the field in order to reduce the number of different lengths repair sleeves necessary.

In this regard, the repair sleeve 9 may be formed to have a tubular cylindrical shape (not illustrated) where the outer diameter of the tube is the effective diameter. Additionally, as can be seen in FIGS. 3 and 11, a preferred form of the repair sleeve 9 includes a plurality of longitudinal indentations or corrugations 10. The purpose of these indentations 10 becomes apparent with reference to FIG. 3 wherein it can be seen that the indentations 10 are aligned with the pressure members 8b for a purpose to be explained hereafter.

Figure 11:
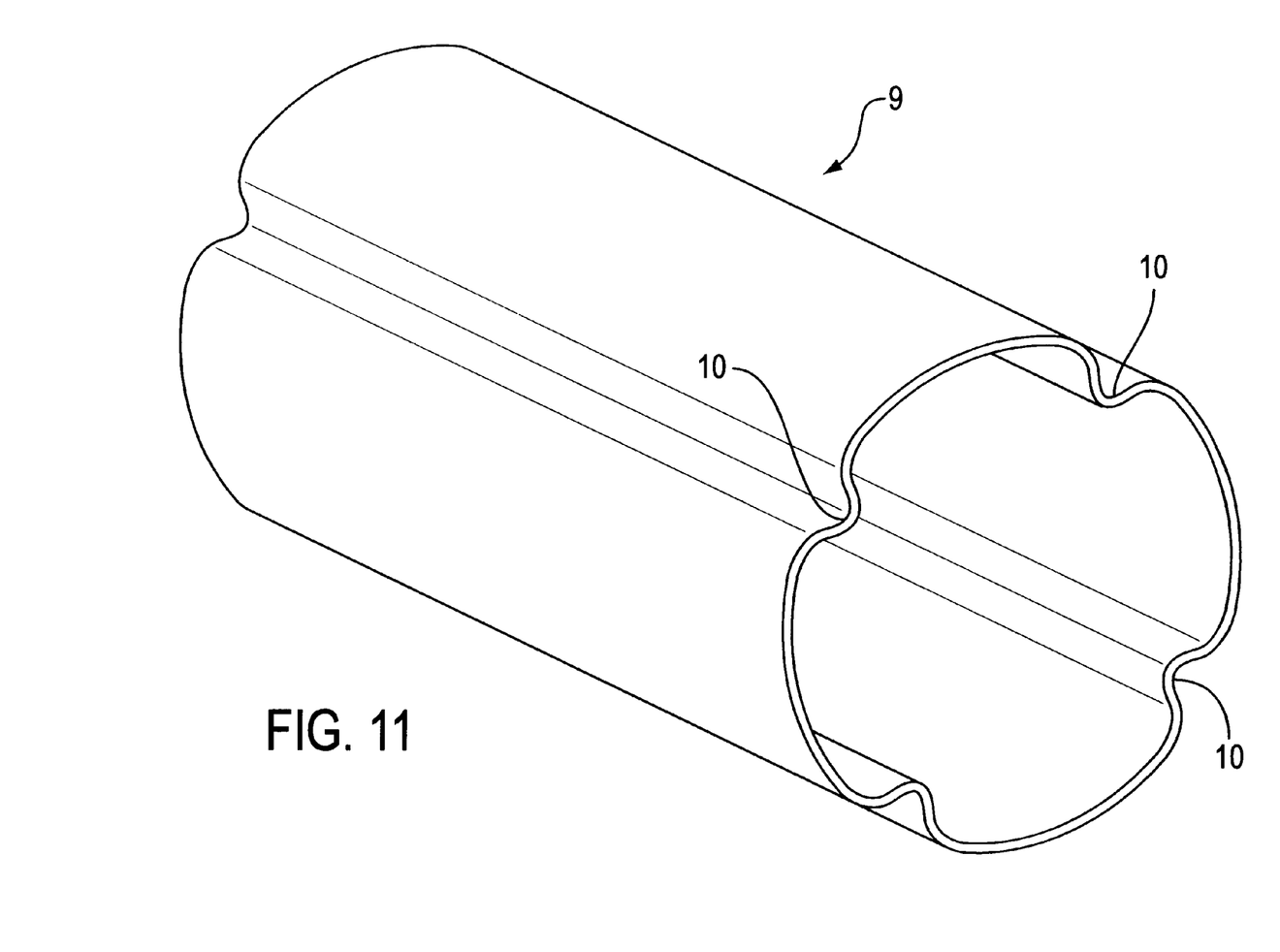
FIG. 11 is a perspective view of a bi-metal repair sleeve according to one embodiment of the present invention.

Accordingly, the repair sleeve 9, as shown in FIG. 11, may be formed from a tubular cylindrical member having an outer diameter that may initially be greater than the inside diameter of a host pipe H to be repaired. Subsequently, the tubular cylindrical member is inwardly deformed to form at least one longitudinally extending indentation or corrugation 10 which reduces the initial outer diameter of the repair sleeve to an effective outer diameter that can be easily introduced into the host pipe H. This configuration of the repair sleeve 9 permits an extremely tight fitting engagement of the outer diameter thereof with the inner diameter of the host pipe H without requiring extensive radial and circumferential deformation of the repair sleeve 9. Of course, the tubular cylindrical member forming the repair sleeve 9 shown in FIG. 11 is a tubular bi-metal sleeve as earlier described.

The method of operation of the conduit repair apparatus 1 will now be described with reference to FIGS. 1–3 and 8–10. With reference to FIG. 1, it can be seen that a repair sleeve 9 is initially positioned on the expansion and brake mechanism 8, and the carriage 2 is moved to a position where the repair is to be effected. The CCTV camera 3a aids in positioning of the repair sleeve 9 at the proper location as seen in FIG. 1. Upon the proper positioning of the repair sleeve 9 and the expansion and brake mechanism 8 at the location where the repair is to be effected, the repair sleeve 9 is subjected to a radial expansion force by actuation of the drive devices D for the plurality of pressure members 8a, 8b to apply a radially outward force to the inner wall of the repair sleeve 9 such that the soft outer layer of the repair sleeve 9 is firmly pressed against the inner wall of the host pipe HP. As can be seen in FIG. 3, the preferred construction of the repair sleeve 9 to include the longitudinal indentations 10 permits an outward expansion of the effective diameter of the repair sleeve 9 by pressing the indentations 10 outwardly and into engagement with the inner wall of the host pipe HP such that the repair sleeve 9 tightly frictionally engages the inner wall of the host pipe HP to prevent rotation of the repair sleeve 9 relative to the host pipe HP. However, the repair sleeve 9 can have any suitable configuration for placement and expansion within a conduit, such as cylindrical.

Once the repair sleeve 9 has been radially expanded into engagement with host pipe HP, the drive devices D of the expansion and brake mechanism 8 are retracted, and the carriage 2 is moved to reposition the expansion and brake mechanism 8 to a position outside of the repair sleeve 9, as seen in FIG. 2, and the force applicator mechanism 7 is positioned to engage the inner wall of the repair sleeve 9. The CCTV camera 3b positioned on the right hand side of carrying frame 2 as seen in FIG. 2 is used to aid in positioning the force applicator mechanism 7 relative to the repair sleeve 9. Once the force applicator mechanism 7 is positioned at one end of the repair sleeve 9, the force applicator mechanism 7 is actuated to apply a radially outward force by the force applicators (P, H, S) and a rotational movement is provided by the power source 6. Thus, with the repair sleeve 9 fixed against rotation by its engagement with the inner wall of the host pipe HP, the force applicator mechanism 7 rotates and radially expands to deform the malleable inner sleeve 9a of repair sleeve 9 which is thereby expanded and further presses the soft outer layer 9b against the inner wall of the first pipe HP to create a seal which is resistant to exfiltration of high temperature, high pressure fluids flowing within the host pipe HP.

Figure 8:
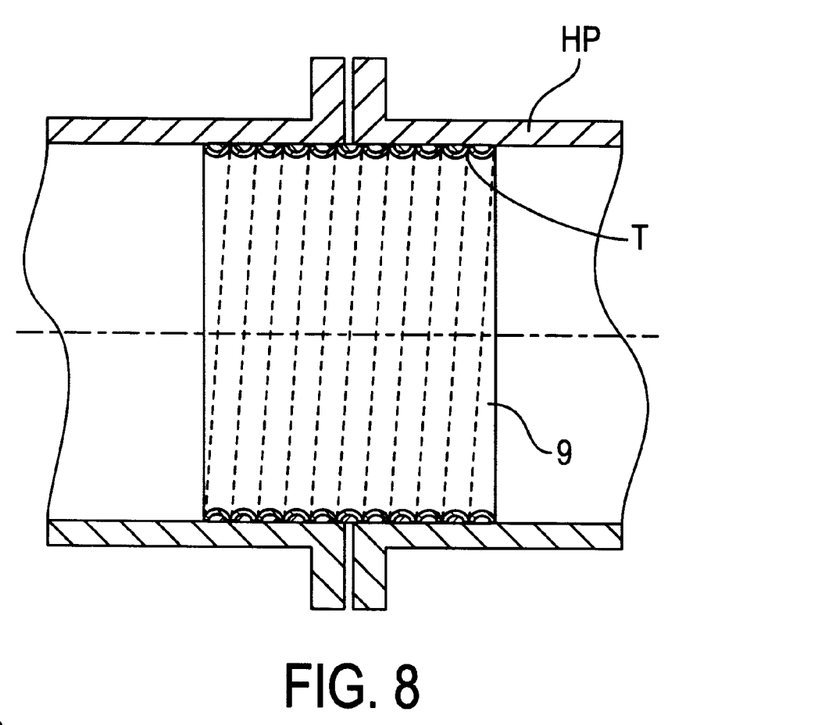
FIG. 8 is a partial cross-sectional view showing a repair sleeve of the present invention positioned within a host pipe subsequent to deformation by the force applicators of the present invention.

It should be noted that the spinning and radially outward expansion force applied by the force applicator mechanism 7 can be performed by any of the hammering applicators H, the spinning applicators S, or the pressing applicators P as depicted in FIGS. 5–7, respectively. Additionally, the hammering, spinning, or pressing applicators can be mounted in a rotational plane at an angle less than 90° with respect to the longitudinal axis of the drive conduit 5 such that the rotating applicators (H, S, P) of the force applicator mechanism 7 advance longitudinally within the repair sleeve 9 by a "threading" action T (which is depicted in FIGS. 8 and 10) due to the deformation of the repair sleeve 9 as the applicators (H, S, P) of the force applicator mechanism 7 advances along the length of repair sleeve 9 in a generally helical path of movement. Alternatively, the power source 6 can be configured in any conventional manner to drive the force applicator mechanism 7 both rotationally about the carriage 2 and axially with respect thereto to advance the radial force applicators (H, R, P) rotationally about the inner wall of the bi-metal repair sleeve 9 as well as longitudinally thereof in a generally helical path of movement to ensure a uniform pattern of deformation of the malleable inner portion 9a (FIGS. 8 and 10) and consequently of the soft outer layer 9b to effect a uniform sealing of the soft outer layer 9b with the inner wall of the host pipe HP (FIG. 10) to effect an efficient repair.

Once the expansion and brake mechanism 8 is moved to a position exterior of the repair sleeve 9, as depicted in FIG. 2, the mechanical drive devices D for applying a radial force to the pressure members 8a, 8b are actuated to forcibly press the pressure members 8a and 8b against the inner wall of the host pipe HP. Accordingly, the carriage 2 is thus fixed in position with respect to the host pipe HP, which thus permits rotation of the force applicator mechanism 7 by the power source 6 and thereby prevents rotation of the carriage 2 with respect to the host pipe HP.

Furthermore, the carriage 2 may include a central conduit within the drive conduit 5 through which various suitable electric power cables, hydraulic lines, pneumatic lines, etc. may be provided to operate the various mechanisms and drive devices of the conduit repair apparatus 1, as necessary.

Additionally, in certain applications, an additional sealant, such as a natural or synthetic plastic material, a polymer or an epoxy material, may be applied to the outer surface of the layer 9b of repair sleeve 9 to further enhance sealing, in a manner known to those skilled in the art.

The repair sleeve according to the invention described above and the carriage 2 can be transported to the site of a repair according to known methods described, for example, in U.S. Pat. No. 5,351,720.

Although the invention has been described with reference to particular means, materials and embodiments, it is to be understood that the invention is not limited to the particulars expressly disclosed herein, but the invention extends to all equivalents within the scope of the claims that follow.

What is claimed:

1. A conduit repair apparatus comprising:
   a carriage constructed and arranged for movement within a conduit in which repairs are to be effected, said carriage including a carrying frame and a drive member;
   an expansion and brake mechanism provided on said carriage, said expansion and brake mechanism including at least one radially movable engagement member operatively mounted to apply a radially outwardly directed force;
   a force applicator mechanism provided on said carriage, said force applicator mechanism including at least one radially movable pressure member operatively mounted to apply radially outwardly directed pressure and for rotation about an axis of rotation generally coincident with a central longitudinal axis of the conduit in which repairs are to be effected; and
   a power source operatively connected to said force applicator mechanism to rotatably drive said at least one pressure member about said axis of rotation;
   whereby a repair sleeve positionable within the conduit can be radially expanded by said expansion and brake mechanism into engagement with an inner wall of the conduit, said expansion and brake mechanism can be positioned at a location outside the repair sleeve and radially expanded to engage the inner wall of the conduit to hold said carriage fixed relative to the conduit, and said force applicator mechanism can be operated to radially actuate said at least one radially movable pressure member and simultaneously to rotate said at least one pressure member about the axis of rotation to thereby apply radially outwardly directed pressure uniformly to an inner wall of the repair sleeve.

2. The conduit repair apparatus according to claim 1, wherein said expansion and brake mechanism includes a plurality of said radially movable engagement members.

3. The conduit repair apparatus according to claim 2, wherein said engagement members are generally uniformly radially spaced about a central axis.

4. The conduit repair apparatus according to claim 2, wherein said at least one radially movable pressure member is operatively connected to said carriage by at least one of an hydraulic actuator, a pneumatic actuator, and a mechanical actuator which effects radial outward movement of said pressure member to apply said radially outwardly directed pressure.

5. The conduit repair apparatus according to claim 4, wherein said at least one radially movable pressure member comprises a hammering applicator for applying repeated hammering strokes to the inner wall of the repair sleeve.

6. The conduit repair apparatus according to claim 4, wherein said at least one radially movable pressure member comprises a rolling applicator for applying a spinning force application to the inner wall of the repair sleeve.

7. The conduit repair apparatus according to claim 4, wherein said at least one radially movable pressure member comprises a pressing applicator for applying a pressing force application to the inner wall of the repair sleeve.

8. The conduit repair apparatus according to claim 1, wherein said at least one engagement member is operatively connected to said carriage by at least one of an hydraulic actuator, a pneumatic actuator, and a mechanical actuator which effects radial outward movement of said at least one engagement member.

9. The conduit repair apparatus according to claim 1, wherein said force applicator mechanism is operatively mounted on the carriage to provide a generally helical path of movement of said at least one pressure member relative to the inner wall of the repair sleeve.

10. The conduit repair apparatus according to claim 9, wherein said force applicator mechanism is operatively mounted on the carriage and is driven by said power source to move along a longitudinal axis of said carriage to provide said generally helical path of movement of said at least one pressure member relative to the inner wall of the conduit.

11. The conduit repair apparatus according to claim 9, wherein said at least one pressure member is rotatably mounted on the carriage to move in a plane of rotation oriented at an angle of less than 90° with respect to a central longitudinal axis of the repair sleeve to provide said generally helical path of movement of said at least one pressure member relative to the inner wall of the repair sleeve.

12. The conduit repair apparatus according to claim 11, wherein said at least one pressure member is engagable with the inner wall of the repair sleeve to deform the sleeve along said generally helical path to cause said at least one pressure member to thread itself within the repair sleeve.

13. The conduit repair apparatus according to claim 1 in combination with a malleable repair sleeve, said sleeve being expandable by said expansion and brake mechanism into engagement with an inner wall of the conduit to be repaired, and subsequently further deformable by said force applicator mechanism such that an outer surface of said repair sleeve can be firmly pressed into engagement with the inner wall of the conduit to create a seal to effect the repair.

14. The combined repair apparatus and malleable repair sleeve according to claim 13, wherein said malleable repair sleeve comprises a bi-metal repair sleeve having an inner layer of a first malleable material and an outer layer of a second malleable material.

15. The combined repair apparatus and malleable repair sleeve according to claim 14, wherein said second malleable material is softer than said first malleable material.

16. The combined repair apparatus and malleable repair sleeve according to claim 15, wherein said first malleable material comprises steel and said second malleable material is selected from the group comprising lead, tin, bronze and buter.

17. A method of repairing a conduit comprising:
   positioning a repair sleeve at a location within a conduit to be repaired;
   expanding said repair sleeve into engagement with an inner wall of the conduit by actuation of an expansion and brake mechanism exerting an internal outwardly directed radial force on said repair sleeve;

further deforming said repair sleeve into sealing engagement with the inner wall of the conduit by actuation of a force application mechanism exerting a rotating internal outwardly directed radial force on said repair sleeve.

18. The method of repairing a conduit according to claim 17, wherein said rotating internal radial force is applied by hammering.

19. The method of repairing a conduit according to claim 17, wherein said rotating internal radial force is applied by spinning.

20. The method of repairing a conduit according to claim 17, wherein said rotating internal radial force is applied by pressing.

21. The method of repairing a conduit according to claim 17, further comprising mounting said expansion and brake mechanism and said force application mechanism on a movable carriage, and wherein said positioning is provided by initially mounting said repair sleeve on said expansion and brake mechanism and moving said carriage with said repair sleeve mounted on said expansion and brake mechanism to said location.

22. The method of repairing a conduit according to claim 21, including moving said carriage to move said expansion and brake mechanism to a position spaced from said repair sleeve subsequent to said expanding of said repair sleeve into engagement with an inner wall of the conduit by actuation of said expansion and brake mechanism, and further actuation of said expansion and brake mechanism to thereby engage the inner wall of the conduit to fixedly position said carriage within the conduit.

23. The method of repairing a conduit according to claim 22, rotatably mounting said force applicator mechanism on said carriage for rotation by a power source mounted on said carriage, said force applicator mechanism including at least one radially actuatable member for exerting said outwardly directed radial force, and whereby said deforming of said repair sleeve results from rotating said force application mechanism during actuation of said at least one radial actuatable member.

24. The method of repairing a conduit according to claim 23, further comprising advancing said force applicator mechanism along a central longitudinal axis of said repair sleeve during rotation of said force applicator mechanism to effect uniform deformation of said repair sleeve along a length thereof.

25. The method of repairing a conduit according to claim 24, further comprising mounting said force applicator mechanism on said carriage such that a plane of rotation of said at least one radial actuatable member is positioned at an angle of less than 90° with respect to said longitudinal axis of said repair sleeve such that said at least one radial actuatable member moves along a generally helical path and thereby threadably engages and deforms said repair sleeve to effect said advancing of said force applicator mechanism.

26. The method of repairing a conduit according to claim 24, wherein said deforming of said repair sleeve comprises hammering.

27. The method of repairing a conduit according to claim 24, wherein said deforming of said repair sleeve comprises spinning.

28. The method of repairing a conduit according to claim 24, wherein said deforming of said repair sleeve comprises pressing.

29. The method of repairing a conduit according to claim 17, further comprising providing said repair sleeve as a malleable repair sleeve such that an outer surface of said repair sleeve can be firmly pressed into engagement with the inner wall of the conduit to form a seal therewith in order to effect the repair.

30. The method of repairing a conduit according to claim 29, wherein said malleable repair sleeve comprises a bi-metal repair sleeve having an inner layer of a first malleable material and an outer layer of a second malleable material.

31. The method of repairing a conduit according to claim 30, wherein said second malleable material is softer than said first malleable material.

32. The method of repairing a conduit according to claim 31, wherein said first malleable material comprises steel and said second malleable material is selected from the group comprising lead, tin, bronze and buter.

33. The method of repairing a conduit according to claim 17, further comprising providing said repair sleeve as a malleable repair sleeve having a generally tubular member having an outer diameter selected to be smaller than an inner diameter of a conduit to be repaired, providing said generally tubular member with at least one longitudinal indentation extending inwardly thereof along an entire length of said malleable repair sleeve, whereby said repair sleeve may be readily positioned within the conduit and said at least one longitudinal indentation may be subsequently outwardly deformed by said expanding to cause an outer surface of said malleable repair sleeve to frictionally engage the inner wall of the conduit.

34. A conduit repair apparatus comprising:

a carriage constructed and arranged for movement within a conduit in which repairs are to be effected, said carriage including a carrying frame and a drive member;

an expansion and brake mechanism provided on said carriage, said expansion and brake mechanism including at least one radially movable engagement member operatively mounted to apply a radially outwardly directed force;

a mechanical force applicator mechanism provided on said carriage, said mechanical force applicator mechanism including at least one force application member configured to apply radially outwardly directed force and operatively mounted for rotation about an axis of rotation generally coincident with a central longitudinal axis of the conduit in which repairs are to be effected; and a power source operatively connected to said mechanical force applicator mechanism to rotatably drive said at least one force application member about said axis of rotation;

whereby a repair sleeve positionable within the conduit can be radially expanded by said expansion and brake mechanism into engagement with an inner wall of the conduit, said expansion and brake mechanism can be positioned at a location outside the repair sleeve and radially expanded to engage the inner wall of the conduit to hold said carriage fixed relative to the conduit, and said force applicator mechanism can be operated to actuate said at least one force application member and simultaneously to rotate said at least one force application member about the axis of rotation to thereby apply radially outwardly directed force uniformly to an inner wall of the repair sleeve.

35. A conduit repair apparatus comprising:

a carriage constructed and arranged for movement within a conduit in which repairs are to be effected, said carriage including a carrying frame and a drive member;

a mechanical force applicator mechanism provided on said carriage, said mechanical force applicator mechanism including at least one force application member configured to apply radially outwardly directed force and operatively mounted for rotation about an axis of rotation generally coincident with a central longitudinal axis of the conduit in which repairs are to be effected; and a power source operatively connected to said mechanical force applicator mechanism to rotatably drive said at least one force application member about said axis of rotation;

whereby said force applicator mechanism can be operated to actuate said at least one force application member and simultaneously to rotate said at least one force application member about the axis of rotation to thereby apply radially outwardly directed force uniformly to an inner wall of a repair sleeve positioned within the conduit.

36. A method of repairing a conduit comprising:

positioning a repair sleeve at a location within a conduit to be repaired;

deforming said repair sleeve into sealing engagement with the inner wall of the conduit by actuation of a force application mechanism exerting a rotating internal outwardly directed radial force on said repair sleeve.

* * * * *